United States Patent
Kwon et al.

(10) Patent No.: US 11,066,304 B2
(45) Date of Patent: Jul. 20, 2021

(54) POLYMER GRAFTED GRAPHENE AND METHOD FOR PREPARATION THEREOF

(71) Applicant: LG Chem, Ltd., Seoul (KR)

(72) Inventors: Won Jong Kwon, Daejeon (KR); Yong-O Im, Daejeon (KR); Mi Jin Lee, Daejeon (KR); Gwang Hoon Jun, Daejeon (KR)

(73) Assignee: LG Chem, Ltd.

( * ) Notice: Subject to any disclaimer, the term of this patent is extended or adjusted under 35 U.S.C. 154(b) by 136 days.

(21) Appl. No.: 16/496,991

(22) PCT Filed: Nov. 23, 2018

(86) PCT No.: PCT/KR2018/014547
§ 371 (c)(1),
(2) Date: Sep. 24, 2019

(87) PCT Pub. No.: WO2019/103535
PCT Pub. Date: May 31, 2019

(65) Prior Publication Data
US 2020/0290878 A1 Sep. 17, 2020

(30) Foreign Application Priority Data
Nov. 23, 2017 (KR) .................. 10-2017-0157400

(51) Int. Cl.
*C01B 32/194* (2017.01)
*C01B 32/184* (2017.01)

(52) U.S. Cl.
CPC .......... *C01B 32/194* (2017.08); *C01B 32/184* (2017.08)

(58) Field of Classification Search
CPC ... C01B 32/194; C01B 32/184; C01B 32/182; C01B 32/198; C01B 2204/00; C01B 2204/02; C01B 2204/04; C01B 2204/06; C01B 2204/065; C01B 2204/20; C01B 2204/22; C01B 2204/24; C01B 2204/26; C01B 2204/28; C01B 2204/30; C01B 2204/32; C08F 220/06; C08F 220/18
See application file for complete search history.

(56) References Cited

U.S. PATENT DOCUMENTS

| 2008/0085234 | A1 | 4/2008 | Phillips et al. | |
| 2011/0245384 | A1 | 10/2011 | Bismarck et al. | |
| 2015/0218094 | A1* | 8/2015 | Braunschweig | C07D 209/08 548/455 |
| 2015/0329741 | A1 | 11/2015 | Yoo et al. | |
| 2016/0194207 | A1 | 7/2016 | Bassani et al. | |
| 2017/0044099 | A1 | 2/2017 | Braunschweig et al. | |
| 2017/0218243 | A1 | 8/2017 | Song et al. | |
| 2018/0237677 | A1 | 8/2018 | Song et al. | |
| 2019/0051903 | A1 | 2/2019 | Manabe et al. | |

FOREIGN PATENT DOCUMENTS

| CN | 102675512 B | 12/2014 |
| JP | H01254237 A | 10/1989 |
| JP | 2010253406 A | 11/2010 |
| JP | 2011526577 A | 10/2011 |
| JP | 2016029004 A | 3/2016 |
| KR | 20120104767 A | 9/2012 |
| KR | 20130029972 A | 3/2013 |
| KR | 20140086170 A | 7/2014 |
| KR | 20160038036 A | 4/2016 |
| KR | 20170092361 A | 8/2017 |
| WO | 2014201603 A1 | 12/2014 |
| WO | 2017154533 A1 | 9/2017 |

OTHER PUBLICATIONS

Bian, et al., Covalently Patterned Graphene Surfaces by a Force-Accelerated Diels-Alder Reaction, JACS 2013; 135: 9240-9243 (Year: 2013).*
Yuan, et al., One-step functionalization of graphene with cyclopentadienyl-capped macromolecules via Diels-Alder "click" chemistry, J. Mater. Chem. 2012; 22: 7929-7936 (Year: 2012).*
Bian et al.,Covalently Patterned Graphene Surfaces by a Force-Accelerated Diels-Alder Reaction, Journal of the American Chemical Society, Published Jun. 2013, pp. 9240-9243, vol. 135.
International Search Report for Application No. PCT/KR2018/014547, dated Mar. 6, 2019, pp. 1-2.
Nebhani et al., Functionalization of Fullerenes with Cyclopentadienyl and Anthracenyl Capped Polymeric Building Blocks via Diels-Alder Chemistrya, Macromolecular Rapid Communications, 2010, pp. 1298-1305, vol. 31, Wiley-VCH Verlag GmbH & Co.
Seo et al., A solvent-free Diels-Alder reaction of graphite into functionalized graphene nanosheets, Chemical Communication, Published Oct. 2014, pp. 14651-14653, vol. 50, Royal Society of Chemistry.
Yuan et al., One-step functionalization of graphene with cyclopentadienyl-capped macromolecules via Diels-Alder "click" chemistry, Journal of Materials Chemistry, Published Mar. 2012, pp. 7929-7936, vol. 22, Royal Society of Chemistry.
Bian et al., "Covalently Patterned Graphene Surfaces by a Force-Accelerated Diels-Alder Reaction", Journal of the American Chemical Society, vol. 135, No. 25, Jun. 17, 2013, pp. 9240-9243, XP55617362, ISSN: 0002-7863, DOI: 10.1021/ja4042077.
Extended European Search Report including the Written Opinion for Application No. EP 18880161.7 dated Mar. 17, 2020, 6 pages.

* cited by examiner

*Primary Examiner* — Daniel C. McCracken
(74) *Attorney, Agent, or Firm* — Lerner, David, Littenberg, Krumholz & Mentlik, LLP

(57) ABSTRACT

The present invention provides graphene in which a polymer having a functional group capable of improving the dispersibility of graphene is bonded to the surface of the graphene. The present invention also provides a method for preparing the graphene described above.

9 Claims, 1 Drawing Sheet

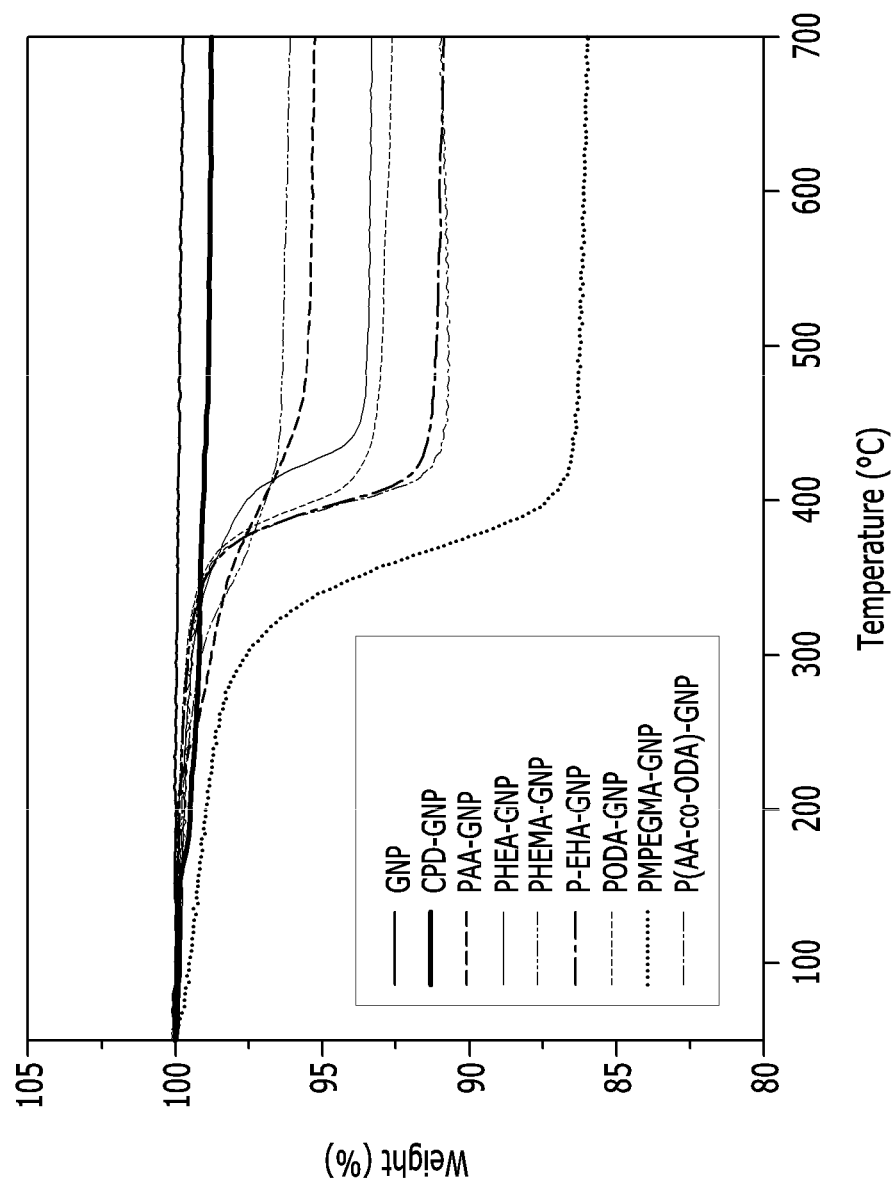

POLYMER GRAFTED GRAPHENE AND METHOD FOR PREPARATION THEREOF

CROSS-REFERENCE TO RELATED APPLICATIONS

The present application is a national phase entry under 35 U.S.C. § 371 of International Application No. PCT/KR2018/014547 filed Nov. 23, 2018, which claims priority from Korean Patent Application No. 10-2017-0157400 filed Nov. 23, 2017, all of which are incorporated herein by reference.

TECHNICAL FIELD

The present invention relates to graphene in which a polymer having a functional group capable of improving the dispersibility of graphene is bonded to the surface of the graphene, and a method for preparing the same.

BACKGROUND ART

Graphene is a semimetallic material where carbon atoms form an arrangement connected in a hexagonal shape by two-dimensional sp2 bonding while having a thickness corresponding to a carbon atom layer. Recently, it has been reported that the properties of a graphene sheet having one carbon atomic layer were evaluated, and as a result, the graphene sheet may show very excellent electrical conductivity of electron mobility of about 50,000 $cm^2Ns$ or more.

In addition, graphene has the properties of structural and chemical stability and excellent thermal conductivity. Moreover, graphene is consisting of only carbon which is a relatively light element, and thus, easy to be processed in one-dimensional or two-dimensional nano-patterns. Due to such electrical, structural, chemical and economical properties, graphene is expected to replace a silicon-based semiconductor technology and a transparent electrode in the future, and especially, is possible to be applied to a flexible electronic device field due to excellent mechanical properties.

On the other hand, graphene is very strong in self-aggregation property and thus is not well dispersed in polymers or solvents, which is a factor that limits the application of graphene. In order to improve the dispersibility of such graphene, it is necessary to functionalize the graphene with a functional group that can be mixed well with a polymer or solvent used as a matrix, or a polymer containing the functional group.

As a method for introducing a functional group onto the surface of the graphene, methods using oxidation methods such as Hummer's method have been reported. When graphene is oxidized with a strong acid, functional groups such as a hydroxyl group, an epoxy group and a carboxylic acid group are formed on the surface of the oxidized graphene, and these functional groups are used to perform additional reactions.

However, when such oxidized graphene is used, it is not possible to specify types of the functional groups to be introduced, and the above-mentioned hydroxy group, epoxy group, carboxylic acid group, etc. exist in a mixed manner. Thus, when additional reactions are performed using such functional groups, types of reactions are also not specified and will only be diversified. In addition, in the process of oxidizing graphene, oxidation reaction proceeds not only at the edges of graphene but also in the internal structure of graphene, which results in a limitation that the structural and chemical properties unique to graphene are lost, and the use of a strong oxidizing agent also creates environmental pollution problems.

Accordingly, there is a need for development of a surface-modifying method which allows a specific functional group to be introduced onto the surface of the graphene while maintaining the structural and chemical properties of the graphene as they stand. As an example, there is a case where the surface of the graphene has been modified by Diels-Alder reaction of non-oxidized graphene using maleic anhydride and maleimide. However, after the substance is modified on the surface of the graphene, polymer polymerization or the like cannot be additionally performed, which results in a limitation to the functionalization of graphene.

Accordingly, the present inventors have conducted intensive studies on a method of effectively grafting a polymer onto a graphene surface, and as a result, have found that the above requirements can be achieved by a method of firstly modifying the surface of the graphene through Diels-Alder reaction and secondarily polymerizing a monomer with a double bond introduced onto the surface of the graphene, as will be described later, thereby completing the present invention.

DETAILED DESCRIPTION OF THE INVENTION

Technical Problem

An object of the present invention is to provide graphene in which a polymer having a functional group capable of improving the dispersibility of graphene is bonded to the surface of the graphene. Another object of the present invention is to provide a method for preparing the above-mentioned graphene.

Technical Solution

In one embodiment of the present invention, there is provided graphene in which a polymer structure represented by Chemical Formula 1 or 2 is bonded to the surface of the graphene:

[Chemical Formula 1]

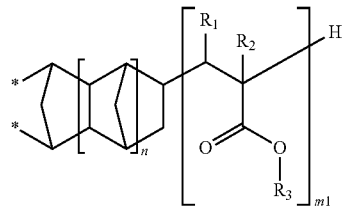

in Chemical Formula 1,
n is an integer of 0 to 20,
m1 is an integer of 1 to 10000,
$R_1$ and $R_2$ are each independently hydrogen, or $C_{1-4}$ alkyl,
$R_3$ is hydrogen, $C_{1-30}$ alkyl, $C_{1-30}$ hydroxyalkyl, or

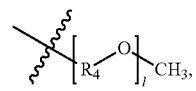

$R_4$ is $C_{2-5}$ alkylene, l is an integer of 1 to 10000,

* means a bond covalently bonded to the surface of the graphene,

[Chemical Formula 2]

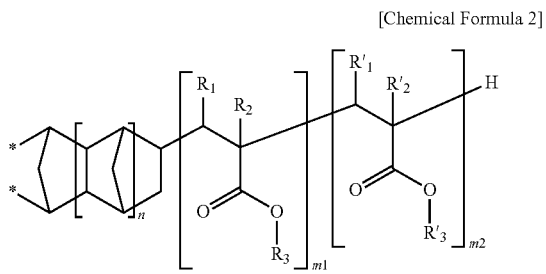

in Chemical Formula 2, n is an integer of 0 to 20, m1 is an integer of 1 to 10000, m2 is an integer of 1 to 10000, $R_1$, $R'_1$, $R_2$, and $R'_2$ are each independently hydrogen, or $C_4$ alkyl, $R_3$ and $R'_3$ are each independently hydrogen, $C_{1-30}$ alkyl, $C_{1-30}$ hydroxyalkyl, or

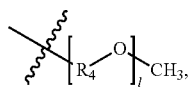

$R_4$ is $C_{2-5}$ alkylene, l is an integer of 1 to 10000,

* means a bond covalently bonded to the surface of the graphene, with the proviso that at least one of $R_1$ and $R'_1$; $R_2$ and $R'_2$; and $R_3$ and $R'_3$ is different from each other.

Graphene in which a Polymer Structure of Chemical Formula 1 is Bonded to the Surface of the Graphene As graphene has a two-dimensional planar structure composed of a single atomic layer of sp2 hybridized carbon, high electrical conductivity and mechanical strength can be realized. Also, for the same reason, graphene is chemically stable and thus, it is difficult to functionalize the surface of the graphene.

In one embodiment of the invention, dicyclopentadiene is used to functionalize such a graphene surface. Specifically, there is provided a method for preparing graphene in which the polymer structure of Chemical Formula 1 is bonded to the surface of the graphene, including the steps of: 1) reacting graphene and dicyclopentadiene to prepare graphene in which a structure represented by Chemical Formula 1a is bonded to the surface of the graphene; and 2) reacting the graphene prepared in step 1 and a compound represented by Chemical Formula 1b.

[Chemical Formula 1a]

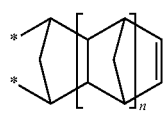

[Chemical Formula 1b]

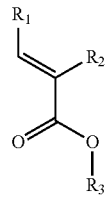

in Chemical Formulas 1 and 2, n, $R_1$, $R_2$, $R_3$, and * are as previously defined.

In addition, the polymer structure of Chemical Formula 1 being bonded to the surface of the graphene means that the portion indicated by * in Chemical Formula 1 is covalently bonded to one of the double bonds of graphene through Diels-Alder reaction. For example, a form in which the polymer structure of Chemical Formula 1 is bonded to the surface of the graphene is schematized as follows.

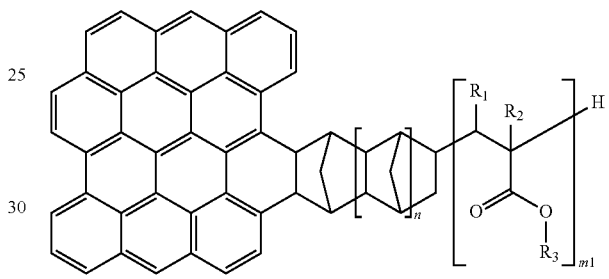

As described above, in an embodiment of the invention, in order to functionalize the graphene surface, graphene is first reacted with dicyclopentadiene to introduce a structure as shown in the above-mentioned Chemical Formula 1-a onto the surface of the graphene. The reaction is a Diels-Alder reaction, which is not theoretically limited, but the binding energy of the double bond at the terminal of graphene is relatively low, and thus the structure as shown in Chemical Formula 1-a is introduced mainly into the terminal part of graphene. Also, since a double bond is present in the introduced structure, it can be reacted again with dicyclopentadiene, thereby increasing the number of n in Chemical Formula 1-a.

When the compound represented by Chemical Formula 1-b is reacted using the double bond of the structure of Chemical Formula 1-a introduced in this way, a polymerization reaction proceeds so that a structure as shown in Chemical Formula 1 can be introduced into the surface of the graphene. Since the structure of Chemical Formula 1 has an ester (—COO—) group, it can improve dispersibility as compared to pure graphene.

Further, since the graphene surface other than the portion where the structure of Chemical Formula 1 is introduced does not change, there is an advantage of being able to maintain the thermal and electrical properties unique to graphene.

Moreover, one or a plurality of the polymer structures of Chemical Formula 1 are bonded to the surface of the graphene. Further, when the plurality of the polymer structures are bonded, the structures of Chemical Formula 1 may be the same as or different from each other.

In Chemical Formula 1, n is preferably an integer of 0 to 10, which is determined according to the degree of reaction between graphene and dicyclopentadiene. Preferably, n is an integer of 1 to 9, 2 to 8, or 3 to 7.

Preferably, m1 is an integer of 1 to 1000, which is determined according to the degree of reaction of the compound represented by Chemical Formula Ib. Preferably, m1 is an integer of 1 to 100.

Preferably, $R_1$ and $R_2$ are each independently hydrogen, or methyl.

Preferably, $R_3$ is hydrogen, 2-ethylhexyl, octadecyl, or 2-hydroxyethyl. Further, preferably, $R_4$ is ethylene (—$CH_2$—$CH_2$—). Further, preferably, l is an integer of 1 to 100, or 1 to 10.

Graphene in which a Polymer Structure of Chemical Formula 2 is Bonded to the Surface of the Graphene Graphene in which a polymer structure of Chemical Formula 2 is bonded to the surface of the graphene means that the repeating ending unit of the polymer is added to Chemical Formula 1. Therefore, for the remaining parts excluding the added repeating unit, the contents described above can be applied without limitation.

Specifically, in another embodiment of the invention, there is provided a method for preparing graphene in which a polymer structure of Chemical Formula 2 is bonded to the surface of the graphene, including the steps of: 1) reacting graphene and dicyclopentadiene to prepare graphene in which a structure represented by Chemical Formula 2a is bonded to the surface of the graphene; and 2) reacting the graphene prepared in step 1, a compound represented by Chemical Formula 2b and a compound represented by Chemical Formula 2c.

[Chemical Formula 2a]

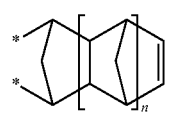

[Chemical Formula 2b]

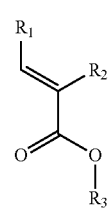

[Chemical Formula 2c]

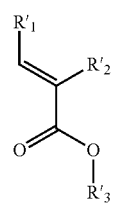

in Chemical Formulas 2a, 2b and 2c, n, $R_1$, $R'_1$, $R_2$, $R'_2$, $R_3$, $R'_3$ and * are as previously defined.

In addition, the two repeating units related to Chemical Formulas 2b and 2c form a random copolymer.

In Chemical Formula 2, n is preferably an integer of 0 to 10, which is determined according to the degree of reaction between graphene and dicyclopentadiene. Preferably, n is an integer of 1 to 9, 2 to 8, or 3 to 7.

Preferably, m1 is an integer of 1 to 1000, which is determined according to the degree of reaction of the compound represented by Chemical Formula 2b. Preferably, m1 is an integer of 1 to 100. Preferably, m2 is an integer of 1 to 1000, which is determined according to the degree of reaction of the compound represented by Chemical Formula 2c. Preferably, m2 is an integer of 1 to 100.

Preferably, $R_1$, $R'_1$, $R_2$, and $R'_2$ are each independently hydrogen, or methyl.

Preferably, $R_3$ and $R'_3$ are each independently hydrogen, 2-ethylhexyl, octadecyl, or 2-hydroxyethyl. Further, preferably, $R_4$ is ethylene(—$CH_2$—$CH_2$—). Further, preferably, l is an integer of 1 to 100, or 1 to 10.

Graphene in which a Polymer Structure is Bonded to the Surface of the Graphene

In addition, the weight of the polymer is 1 to 20% by weight based on the total weight of graphene.

In the polymer grafted graphene prepared according to an embodiment of the invention, a polymer capable of improving the dispersibility is grafted onto the surface of the graphene while maintaining the characteristics unique to graphene, and thus has a feature that the dispersibility in a solvent is excellent. The graphene thus prepared can be utilized for various applications and uses such as a composition for forming a heat dissipation substrate, a conductive paste composition, a conductive ink composition, an electrically conductive composite, a composite for EMI shielding, a conductive material or slurry for a battery, and the like by re-dispersing it in various solvents.

Advantageous Effects

As described above, the polymer grafted graphene according to the present invention has the features that a polymer can be introduced into the surface of the graphene while maintaining the structural and mechanical properties of graphene, thereby realizing excellent dispersibility.

BRIEF DESCRIPTION OF DRAWINGS

The FIGURE shows the results of thermogravimetric analysis (TGA) of graphene prepared in the example of the present invention.

DETAILED DESCRIPTION OF THE EMBODIMENTS

Hereinafter, preferred examples will be presented to facilitate understanding of the present invention. However, these examples are provided for a better understanding of the present invention only, and the scope of the present invention is not limited thereto.

Among the reagents, acrylic acid (AA) was purchased from Samchun Pure Chemical. 2-Hydroxyethyl acrylate (HEA) and 2-ethylhexyl acrylate (EHA) were purchased from Junsei. 1-Vinyl-2-pyrrolidinone (VP), acrylonitrile (AN), dicyclopentadiene (DCPD), octadecyl acrylate (ODA) and methoxy polyethyleneglycol methacrylate (MPEGMA) were purchased from Aldrich. AIBN, NMP and ethanol were purchased from Daejung Chemicals & Metals.

Preparation Example: Preparation of CPD-GNP

A mixed solution of 10 g of DCPD, 10 g of GNP and 120 g of NMP was reacted at 150° C. for 12 hours, cooled to room temperature, filtered under reduced pressure, washed with 500 ml of NMP, 500 ml of ethanol, and 200 ml of acetone, and then dried in an oven at 60° C. to prepare CPD-GNP.

Example 1: Preparation of Poly(acrylic acid)-graft-GNP (PAA-GNP)

A mixed solution of 2 g of acrylic acid, 0.5 g of CPD-GNP, 0.46 g of AIBN and 10 ml of NMP was reacted at 80° C. for 15 hours, cooled to room temperature, filtered, washed with 200 ml of NMP and 200 ml of ethanol, and then dried in an oven at 60° C. to prepare PAA-GNP.

Example 2: Preparation of Poly(methoxypolyethyleneglycol)methacrylate)-graft-GNP (P(MPEGMA)-GNP)

A mixed solution of 4 g of MPEGMA, 1 g of CPD-GNP, 0.072 g of KPS and 30 ml of water was reacted at 80° C. for 15 hours, cooled to room temperature, filtered, washed with 200 ml of water and 200 ml of ethanol, and then dried in an oven at 60° C. to prepare P(MPEGMA)-GNP.

Example 3: Preparation of Poly(hydroxyethylacrylate)-graft-GNP (PHEA-GNP)

A mixed solution of 2 g of HEA, 0.5 g of CPD-GNP, 0.28 g of AIBN and 10 ml of NMP was reacted at 80° C. for 15 hours, cooled to room temperature, filtered, washed with 200 ml of NMP and 200 ml of ethanol, and then dried in an oven at 60° C. to prepare PHEA-GNP.

Example 4: Preparation of Poly(hydroxyethylmetacrylate)-graft-GNP (PHEMA-GNP)

A mixed solution of 2 g of HEMA, 0.5 g of CPD-GNP, 0.25 g of AIBN and 10 ml of NMP was reacted at 80° C. for 15 hours, cooled to room temperature, filtered, washed with 200 ml of NMP and 200 ml of ethanol, and then dried in an oven at 60° C. to prepare PHEMA-GNP.

Example 5: Preparation of Poly(ethyhexylacrylate)-graft-GNP (PEHA-GNP)

A mixed solution of 4 g of EHA, 1 g of CPD-GNP, 0.12 g of AIBN and 3 ml of NMP was reacted at 80° C. for 15 hours, cooled to room temperature, filtered, washed with 200 ml of NMP and 200 ml of hexane, and then dried in an oven at 60° C. to prepare PEHA-GNP.

Example 6: Preparation of Poly(octadecylacrylate)-graft-GNP (PODA-GNP)

A mixed solution of 4 g of ODA, 1 g of CPD-GNP, 0.07 g of AIBN and 3 ml of toluene was reacted at 80° C. for 15 hours, cooled to room temperature, filtered, washed with 200 ml of toluene and 200 ml of hexane, and then dried in an oven at 60° C. to prepare PODA-GNP.

Example 7: Preparation of Poly(acrylic acid)-co-(octadecylacryiate)-graft-GNP (P(AA-co-ODA)-GNP)

A mixed solution of 1 g of ODA, 1 g of AA, 0.5 g of CPD-GNP, 0.093 g of AIBN and 20 ml of NMP was reacted at 80° C. for 6 hours, cooled to room temperature, filtered, washed with 200 ml of NMP and 200 ml of THF, and then dried in an oven at 60° C. to prepare P(AA-co-ODA)-GNP.

Experimental Example 1: Analysis of TGA Data

Thermogravimetric analysis (TGA) was performed under a nitrogen atmosphere in order to confirm how many polymers were functionalized in GNP. The results are shown in the FIGURE. As shown in the FIGURE, it was found that 1 to 13 wt % of polymer was attached to GNP depending on the type of the polymer.

Experimental Example 2: Evaluation of Dispersibility

The polymer grafted graphene prepared in the foregoing Examples were respectively dispersed in a solvent as shown in Table 1 to evaluate the degree of dispersion. The degree of dispersion was evaluated as follows. 40 mg of polymer grafted graphene was mixed with 4 g of a solvent, and then the mixture was dispersed by applying ultrasonic treatment for 30 minutes. The degree of dispersion was evaluated based on the time during which no precipitation occurs in the dispersion and the dispersion is maintained. The evaluation criteria are as follows. Further, for comparison, the GNP used as a starting material in Preparation Examples was evaluated as a comparative example.

⊚ Dispersibility of the dispersion is maintained for 48 hours or more
○: Dispersibility of the dispersion is maintained for 12 to 48 hours
Δ: Dispersibility of the dispersion is maintained for 1 to 12 hours
X: Precipitation occurs in the dispersion within 1 hour

TABLE 1

| | | Water | NMP | EtOH | Acetone | MEK | Toluene | n-Hexane |
|---|---|---|---|---|---|---|---|---|
| Comparative Example | GNP | X | Δ | X | X | X | X | X |
| Example 1 | PAA-GNP | ○ | ⊚ | ⊚ | Δ | Δ | X | X |
| Example 2 | P(MPEGMA)-GNP | Δ | ○ | ⊚ | ○ | ○ | X | X |
| Example 3 | PHEMA-GNP | Δ | ○ | ⊚ | ○ | ○ | X | X |
| Example 4 | PHEA-GNP | Δ | ○ | ⊚ | ○ | ○ | X | X |
| Example 5 | P(EHA)-GNP | X | Δ | Δ | Δ | ○ | ⊚ | Δ |
| Example 6 | P(ODA)-GNP | X | Δ | Δ | Δ | Δ | ⊚ | ○ |
| Example 7 | P(AA)-co-(ODA)-GNP | X | ○ | ○ | Δ | ○ | ⊚ | ○ |

The invention claimed is:

1. Graphene in which a polymer structure represented by the following Chemical Formula 1 or 2 is bonded to the surface of the graphene:

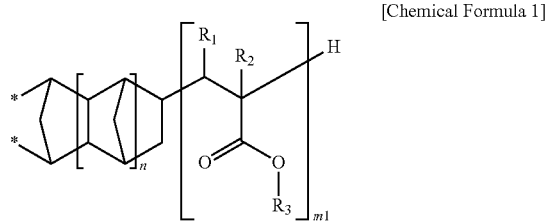

[Chemical Formula 1]

in Chemical Formula 1,
n is an integer of 0 to 20,
m1 is an integer of 1 to 10000,
$R_1$ and $R_2$ are each independently hydrogen, or $C_{1-4}$ alkyl,
$R_3$ is hydrogen, $C_{1-30}$ alkyl, $C_{1-30}$ hydroxyalkyl, or

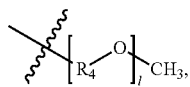

$R_4$ is $C_{2-5}$ alkylene,
l is an integer of 1 to 10000,
* means a bond covalently bonded to the surface of the graphene,

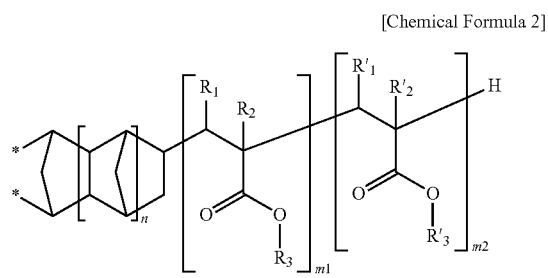

[Chemical Formula 2]

in Chemical Formula 2,
n is an integer of 0 to 20,
m1 is an integer of 1 to 10000,
m2 is an integer of 1 to 10000,
$R_1$, $R'_1$, $R_2$, and $R'_2$ are each independently hydrogen, or $C_{1-4}$ alkyl,
$R_3$ and $R'_3$ are each independently hydrogen, $C_{1-30}$ alkyl, $C_{1-30}$ hydroxyalkyl, or

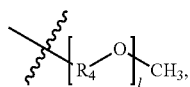

$R_4$ is $C_{2-5}$ alkylene,
l is an integer of 1 to 10000,
* means a bond covalently bonded to the surface of the graphene,
with the proviso that at least one of $R_1$ and $R'_1$; $R_2$ and $R'_2$; and $R_3$ and $R'_3$ is different from each other.

2. The graphene of claim 1,
wherein $R_1$, $R'_1$, $R_2$, and $R'_2$ are each independently hydrogen, or methyl.

3. The graphene of claim 1,
wherein $R_3$ and $R'_3$ are hydrogen, 2-ethylhexyl, octadecyl, or 2-hydroxyethyl.

4. The graphene of claim 1,
wherein $R_4$ is ethylene (—$CH_2$—$CH_2$).

5. The graphene of claim 1,
wherein n is an integer of 0 to 10.

6. A method for preparing the graphene of claim 1 in which the polymer structure of Chemical Formula 1 is bonded to the surface of the graphene, comprising the steps of:
  1) reacting graphene and dicyclopentadiene to prepare graphene in which a structure represented by Chemical Formula 1a is bonded to the surface of the graphene; and
  2) reacting the graphene prepared in step 1 and a compound represented by Chemical Formula 1b:

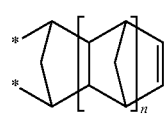

[Chemical Formula 1a]

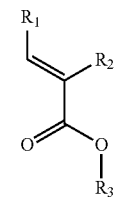

[Chemical Formula 1b]

in Chemical Formulas 1a and 1b,
n, $R_1$, $R_2$, $R_3$, and * are as defined in claim 1.

7. A method for preparing the graphene of claim 1 in which the polymer structure of Chemical Formula 2 is bonded to the surface of the graphene, comprising the steps of:
  1) reacting graphene and dicyclopentadiene to prepare graphene in which a structure represented by Chemical Formula, 2a is bonded to the surface of the graphene; and
  2) reacting the graphene prepared in step 1, a compound represented by Chemical Formula 2b and a compound represented by the Chemical Formula 2c:

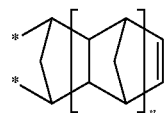

[Chemical Formula 2a]

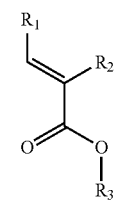

[Chemical Formula 2b]

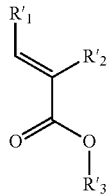
[Chemical Formula 2c]
in Chemical Formulas 2a, 2b and 2c,
n, $R_1$, $R'_1$, $R_2$, $R'_2$, $R_3$, $R'_3$ and * are as defined in claim 1.
8. The graphene of claim 1, wherein n is an integer of 1 to 9, and m1, m2, and are each independently an integer of 1 to 100.
9. The graphene of claim 1, wherein the polymer is 1 to 20% by weight based on the total weight of graphene.
* * * * *